Jan. 21, 1947.  H. A. LAND ET AL  2,414,600
BEARING SEAL
Filed March 5, 1945
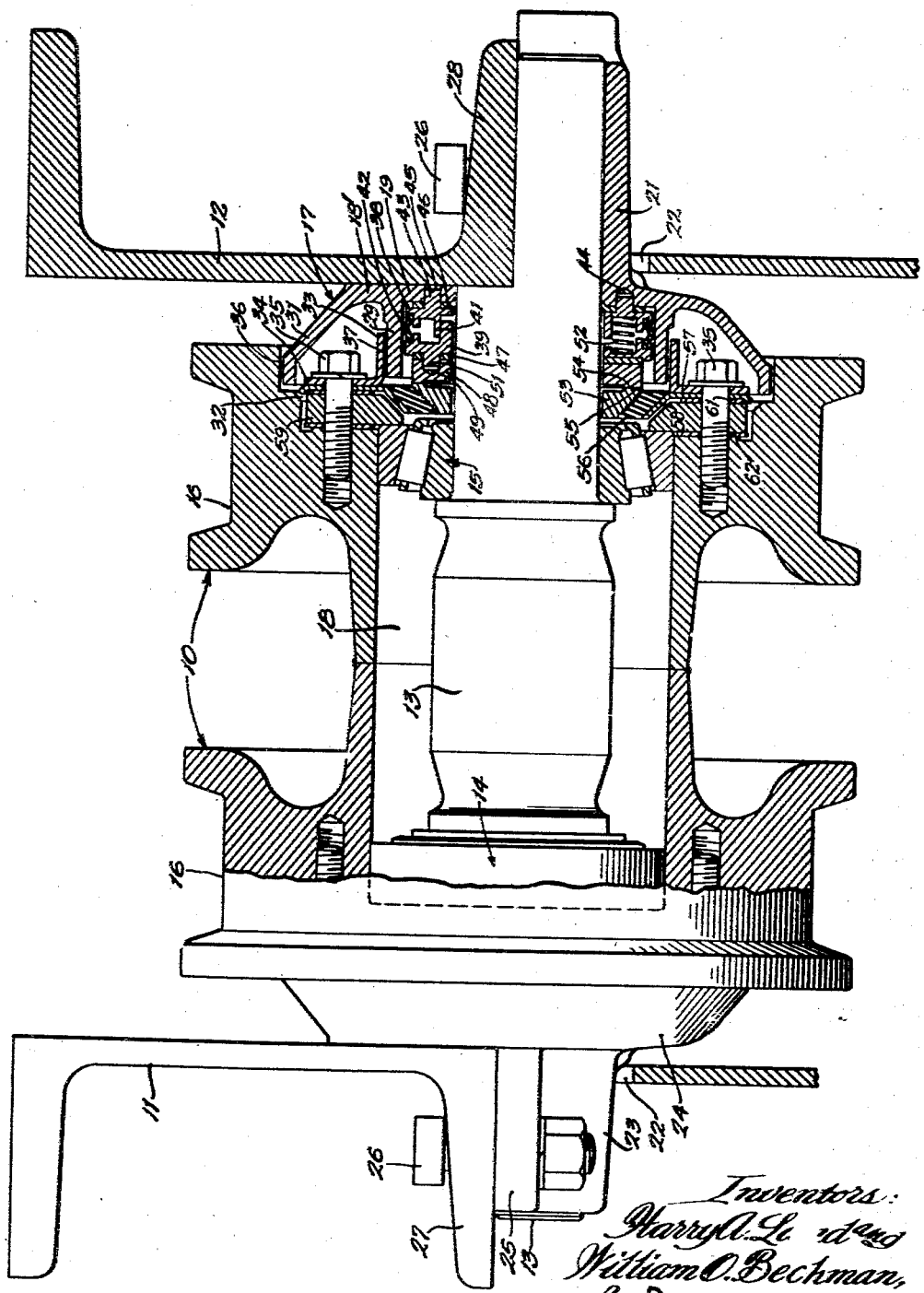
Inventors:
Harry A. Land and
William O. Bechman,
By Paul O. Pippel
Attorney.

Patented Jan. 21, 1947

2,414,600

UNITED STATES PATENT OFFICE 2,414,600

BEARING SEAL

Harry A. Land and William O. Bechman, Chicago, Ill., assignors to International Harvester Company, a corporation of New Jersey Application March 5, 1945, Serial No. 580,940

2 Claims. (Cl. 286—11)

This invention has to do with a seal structure for bearings between relatively rotatable parts to exclude foreign matter from the bearings and to preclude escape of lubricant therefrom.

A general object of the invention is the provision of an improved seal structure capable of instantaneous adjustment to compensate for relative axial movement, relative lateral movement and relative tilting movement of relatively rotative parts between which the structure is installed. Because of its adaptation to these manifold adjustments, a seal embodying the invention is particularly useful between relatively rotatable parts as crawler tractor track-guide rollers and the supporting shafts therefor which are subjected to severe irregular strains.

A more specific object is the provision in a seal having bearing elements with opposed complemental bearing and sealing faces of an universally articulate mounting of impervious elastic material for at least one of the bearing elements to support the same in floating relation to the other elements of the seal as well as to the parts between which the seal is installed.

Other objects pertain to the employment of a universally articulately mounted seal bearing-element in conjunction with an axially adjustable seal unit for mutually contributing to the necessary adjustment attendant to axial displacement of the parts between which the protected bearing is installed; to a concentrically flanged guard member non-rotatively mounted on one of the parts between which the bearing is installed and which flanges project into radially spaced telescopic relation with respective projecting portions upon the other of said parts to effect a labyrinth passage for shielding the bearing elements of the seal from coarse foreign particles; to an arrangement wherein the aforesaid portion telescoping with the inner concentric flange is a relatively thin flange readily deformable by said concentric flange if engaged thereby; and to an arrangement wherein the inner concentric flange envelopes the aforesaid axially adjustable seal unit.

These and additional desirable objects inherent in and encompassed by the invention will be more readily comprehended after reading the following description with reference to the annexed drawing consisting of a single figure which is a view taken transversely through a track frame of a crawler tractor and axially through an end portion of a track roller and a bearing seal constructed according to the principles of the invention.

Since the present bearing seal is particularly well suited for use in conjunction with a bearing for a roller which carries the track of a crawler-type tractor, the drawing illustrates a typical installation of a track roller. This roller which is designated 10 is one of several which are similarly mounted and distributed lengthwise of and between laterally spaced track frame members 11 and 12. Each roller 10 is carried upon a non-rotatable shaft 13 which has its opposite ends anchored in the frame members 11 and 12. Roller bearing units 14 and 15 are mounted upon each shaft 13 with their inner races pressed firmly upon their respective portions of their shaft and with their outer races firmly engaging the inner periphery of their respective roller 10. Each roller has a pair of circumferential grooves 16 for receiving and guiding the links of a track (not shown).

Identical seal structures are employed for the bearings 14 and 15, so it will suffice to refer solely to the seal structure illustrated in longitudinal section in conjunction with the bearing unit 15. One purpose of the bearing seal structure, which is generally designated 17, is to prevent the leakage of lubricating oil from the pocket 18 formed between the inner periphery of the roller 10 and the shaft 13. If it were not for the seal structure, the lubricant within the pocket 18 would escape between the rollers of the bearing units 15. A further purpose of the structure 17 is to prevent foreign matter from reaching the bearing unit 15.

A dust guard member 18' of the oil seal structure comprises a radial web-portion 19 formed integrally with a hub portion 21 which projects outwardly through an opening 22 in the track frame. This hub 21 is semi-cylindrical and embraces the lower half of the right end portion of the shaft 13. A better understanding of this construction can be had by reference to the left end of the figure where the hub 23 of the corresponding guard member 24 is shown embracing the lower half of the left end of the shaft 13. The diametrical opposite end portions of the semi-circular hubs 21 and 23 have flanges 25 projecting horizontally therefrom for receiving the shanks of bolts 26 which secure these flanges to flanges 27 and 28 projecting outwardly from the track frame. In this manner the guard members 18' and 24 are non-rotatably fixed with respect to the shaft 13.

Guard member 18' has a pair of radially spaced inner and outer concentric flanges 29 and 31 formed integrally with the web 19. Flange 31 projects into radially spaced telescopic relation with the side wall of a recess 32 formed in the associated end of the roller 10 while the flange 29 projects into slightly radially spaced telescopic relation with a flange 33 of a ring 34 secured to the roller by a number of cap-screws 35 threaded into the roller at the bottom of the recess 32. Flanges 29 and 31 thereby cooperate with mated telescope portions upon the roller in forming narrow openings 36—37 of a labyrinth passage for excluding entry of coarser foreign particles into the interior portions of the seal structure.

An axially expansive sealing unit 38 is enclosed in the space between the guard flange 29 and the shaft 13. This unit comprises a pair of telescopic rings 39 and 41 bridged near their outer peripheries by a short flexible walled tubular element 42 which is impervious to dirt particles and oil. Ring member 41 has axially projecting studs 43 spaced circumferentially thereabout and disposed within recesses 44 and holes 45 in the guard member 18' to prevent rotation of said member. A thin ring 46 of sealing material is disposed between the outer face of the ring 41 and the opposed surface of the guard member 18'. A similar ring 47 of sealing material is disposed between the inner face of the ring 39 and a sealing bearing element 48 which has recesses 49 distributed circumferentially thereabout for receiving studs 51 on the ring 39. Circumferentially spaced helical springs 52 between the rings 39 and 41 constantly urge said rings 39 and 41 axially apart and thereby maintain a firm contacting relation between the sealing rings 46 and 47 and the surfaces between which they are interposed.

An annular ring element 53 cooperates with the annular sealing element 48. Sealing element 48 is constrained against rotation by the studs 51 of the expansible sealing device 38 and has a bearing face 54 disposed in slidable sealing relation with an opposed bearing face 55 on the element 53. Element 53 is spaced slightly radially from the shaft 13 to permit movement relatively to said shaft and is connected for rotation with the roller 10 by an annular body 56 of elastic flowable rubber-like material such as "neoprene" and an annular anchorage member 57 which is secured to the roller by the cap-screws 35. The outer periphery of the sealing element 53 is tapered axially toward the end thereof opposite to that carrying the bearing face 55 and a portion 58 of the annular anchorage member 57 is tapered in the same axial direction. The annular body 56 of elastic flowable material is suitably bonded as by vulcanizing to the anchorage member 57 and to the sealing element 53 so as to form a complete seal at the connections thereof with these parts.

The cap-screws 35, in addition to securing the annular flanged member 34 and the annular anchorage member 57 to the roller 10, also serve to fasten a retaining ring 59 for the outer race of the roller bearing unit 15 in position. Annular sealing gaskets 61 and 62 are placed on opposite ends of the retaining ring 59.

When the device is installed the helical springs 52 in the sealing unit 38 are in a condition of axial compression and therefore serve while reacting against the ring 41 to urge the ring 39 and the sealing element 48 axially to the left. This presses the sealing face 54 of the element 48 against the complemental relatively slidable face 55, placing a slight strain in the impervious elastic body 56. None of the annular parts 41, 39, and 48 rotate relatively nor do these parts rotate relatively to the guard member 18. Consequently the ends of the flexible tubular member 42 can be securely clamped to the members 39 and 41 to provide a very effective seal between these members. Also the relative non-rotative relation between the member 41 and the guard 18 between the member 39 and the annular element 48 facilitates a fixed installation of the annular sealing members 46 and 47 in a permanent fashion so they can serve as very effective seals.

Relative rotative movement takes place only between the annular bearing-type sealing elements 48 and 53 at their opposed bearing faces 54 and 55. Bearing faces 54 and 55 serve as effective seals so long as these faces are uniformly engaged over their entire area. It is the function of the universal articulate connection 56 to maintain contact of the faces 54 and 55 over their entire area irrespective of whether the shaft 13 and the roller 10 are perfectly alined or their axes precisely parallel. When great stresses are placed upon the track frame members 11 and/or the track roller 10, a condition is sometimes incurred wherein the axis of the roller and that of the shaft 13 will be tilted or canted relatively to one another, so that, if it were not for the universal yieldable character of the annular body 56 supporting the bearing sealing element 53, this element would also be tilted relatively to the element 48 and cause uneven wearing of the bearing surfaces 54 and 55 to develop a leakage space therebetween. Any likelihood of this contingency is overcome by the annular member 56.

A single preferred embodiment of the invention has been herein shown and described with the view of illustrating the principles of and the method of practicing the invention.

What is claimed is:

1. In a seal, companion bearing elements with opposed annular end faces respectively thereon for cooperation in sliding sealing relation during relative rotation of such elements, one of said elements having a radially outwardly disposed periphery tapering toward the end thereof opposite to that carrying the annular face of such element, an anchorage ring disposed about said one element and having an annular outer mounting flange portion projecting radially of the axis of such ring and an inner conical flange portion with an inner periphery in radially opposed circumscribing relation with said outer periphery of said element and tapered in the same axial direction, and an elastic cushion ring of impervious flowable material interposed between and bonded to said peripheries in sealed connection therewith.

2. A seal comprising an annular bearing element having a bearing and sealing end face and a radially outward periphery formed conically to taper toward the end opposite to that carrying said end face, a sheet metal anchorage ring concentrically about said annular element and having an annular outer mounting flange portion and an inner conical flange portion with an inner periphery in radially opposed circumscribing relation with said outer periphery of said element and tapered in the same axial direction, and an elastic cushion ring of impervious flowable material interposed between and bonded to said peripheries in sealed connection therewith.

HARRY A. LAND.
WILLIAM O. BECHMAN.